US012594995B2

(12) United States Patent
Dai et al.

(10) Patent No.: US 12,594,995 B2
(45) Date of Patent: Apr. 7, 2026

(54) MOUNTING BEAM FOR VEHICLE, FRONT CABIN ASSEMBLY, VEHICLE AND OPTIMIZATION DESIGN METHOD FOR MOUNTING BEAM

(71) Applicant: XIAOMI EV TECHNOLOGY CO., LTD., Beijing (CN)

(72) Inventors: Tailiang Dai, Beijing (CN); Rong Zeng, Beijing (CN); Tao Ma, Beijing (CN); Zhibing Han, Beijing (CN); Dongpo Liu, Beijing (CN)

(73) Assignee: XIAOMI EV TECHNOLOGY CO., LTD., Beijing (CN)

( * ) Notice: Subject to any disclaimer, the term of this patent is extended or adjusted under 35 U.S.C. 154(b) by 414 days.

(21) Appl. No.: 18/209,369

(22) Filed: Jun. 13, 2023

(65) Prior Publication Data

US 2024/0227937 A1 Jul. 11, 2024

(30) Foreign Application Priority Data

Jan. 6, 2023 (CN) .......................... 202310018633.4

(51) Int. Cl.
B62D 21/02 (2006.01)
B62D 25/08 (2006.01)

(52) U.S. Cl.
CPC ............. B62D 21/02 (2013.01); B62D 25/08 (2013.01)

(58) Field of Classification Search
CPC ...... B62D 25/08; B62D 25/082; B62D 21/02; B62D 21/15; B62D 21/152; B62D 27/023; B62D 65/00; B62D 65/02; B62D 65/04

USPC ..... 296/187.09, 1, 203.01, 2, 193.09, 29, 30
See application file for complete search history.

(56) References Cited

U.S. PATENT DOCUMENTS

| | | | |
|---|---|---|---|
| 5,411,311 A | 5/1995 | Shimmell et al. | |
| 10,144,456 B1 * | 12/2018 | Ciccone | B62D 25/082 |
| 11,034,387 B2 * | 6/2021 | Moss | B62D 21/09 |

(Continued)

FOREIGN PATENT DOCUMENTS

| | | |
|---|---|---|
| CN | 212605452 U | 2/2021 |
| CN | 212980355 U | 4/2021 |

(Continued)

OTHER PUBLICATIONS

CN 118025337 A (Year: 2024).*
Chinese Patent Application No. 202310018633.4, First Office Action dated Dec. 27, 2024, with English translation, 28 pages.

*Primary Examiner* — Jacob S. Scott
(74) *Attorney, Agent, or Firm* — Cozen O'Connor

(57) ABSTRACT

A mounting beam includes a beam body provided with a plurality of mounting areas configured to mount a front cabin accessory. The beam body includes a first cross beam, a second cross beam, a first oblique beam and a second oblique beam. The first and second cross beams are arranged in parallel and spaced apart from each other, and both the first and second cross beams are configured to couple a left shock absorber tower to a right shock absorber tower. Each of the first and second oblique beams intersects with the second cross beam, first ends of the first and second oblique beams are coupled to the first cross beam, and second ends of the first and second oblique beams are coupled to each other to form a first joint. The first joint is configured to be coupled to a dash panel.

18 Claims, 5 Drawing Sheets

(56)                     References Cited

U.S. PATENT DOCUMENTS

2023/0174159 A1 *   6/2023   Park ........................ B60R 19/48
                                                    296/187.09

FOREIGN PATENT DOCUMENTS

CN          114818098 A       7/2022
CN          118025337 A   *   5/2024   ........... B62D 25/082

* cited by examiner

MOUNTING BEAM FOR VEHICLE, FRONT CABIN ASSEMBLY, VEHICLE AND OPTIMIZATION DESIGN METHOD FOR MOUNTING BEAM

CROSS-REFERENCE TO RELATED APPLICATIONS

The present application claims the benefit of priority to Chinese Application No. 202310018633.4, filed on Jan. 6, 2023, the contents of which are incorporated herein by reference in their entireties for all purposes.

BACKGROUND

As one of main parts of vehicles, a front cabin of the vehicles is mainly used to integrate and mount a compressor, a cooling module, an expansion tank and other components.

SUMMARY

The present disclosure relates to a field of vehicles, in particular to a mounting beam for a vehicle, a front cabin assembly, a vehicle employing the mounting beam and an optimization design method for the mounting beam.

A vehicle mounting beam for the vehicle according to embodiments of the present disclosure includes a beam body. The beam body is provided with a plurality of mounting areas, the plurality of mounting areas is configured to mount a front cabin accessory, and the beam body includes: a first cross beam, a second cross beam, a first oblique beam and a second oblique beam. The first cross beam and the second cross beam are arranged in parallel and spaced apart from each other, and each of the first cross beam and the second cross beam is configured to be coupled between a left shock absorber tower and a right shock absorber tower. Each of the first oblique beam and the second oblique beam interests with the second cross beam, a first end of the first oblique beam and a first end of the second oblique beam are coupled to the first cross beam, and a second end of the first oblique beam is coupled to a second end of the second oblique beam to form a first joint configured to be coupled to a dash panel.

A front cabin assembly includes a left shock absorber tower, a right shock absorber tower, a front cabin accessory, a dash panel and a mounting beam. The mounting beam includes a beam body. The beam body is provided with a plurality of mounting areas, the plurality of mounting areas is configured to mount a front cabin accessory, and the beam body includes: a first cross beam, a second cross beam, a first oblique beam and a second oblique beam. The first cross beam and the second cross beam are arranged in parallel and spaced apart from each other, and each of the first cross beam and the second cross beam is configured to be coupled between a left shock absorber tower and a right shock absorber tower. Each of the first oblique beam and the second oblique beam interests with the second cross beam, a first end of the first oblique beam and a first end of the second oblique beam are coupled to the first cross beam, and a second end of the first oblique beam is coupled to a second end of the second oblique beam to form a first joint configured to be coupled to a dash panel.

An optimization design method for a mounting beam. The mounting beam includes a beam body. The beam body is provided with a plurality of mounting areas configured to mount a front cabin accessory, and the beam body includes: a first cross beam, a second cross beam, a first oblique beam and a second oblique beam. The first cross beam and the second cross beam are arranged in parallel and spaced apart from each other, and each of the first cross beam and the second cross beam is configured to be coupled between a left shock absorber tower and a right shock absorber tower. Each of the first oblique beam and the second oblique beam interests with the second cross beam, a first end of the first oblique beam and a first end of the second oblique beam are coupled to the first cross beam, and a second end of the first oblique beam is coupled to a second end of the second oblique beam to form a first joint configured to be coupled to a dash panel. The method includes: creating, by a processor, a body-in-white model with a design space for the mounting beam; determining, by a processor, an optimal force transmission path of the mounting beam in the design space through topology optimization; creating, by a processor, an initial model of the mounting beam according to the optimal force transmission path; and processing, by a processor, an optimization design for a specific structure of the initial model and obtaining, by a processor, a final model of the mounting beam.

Figure 1:
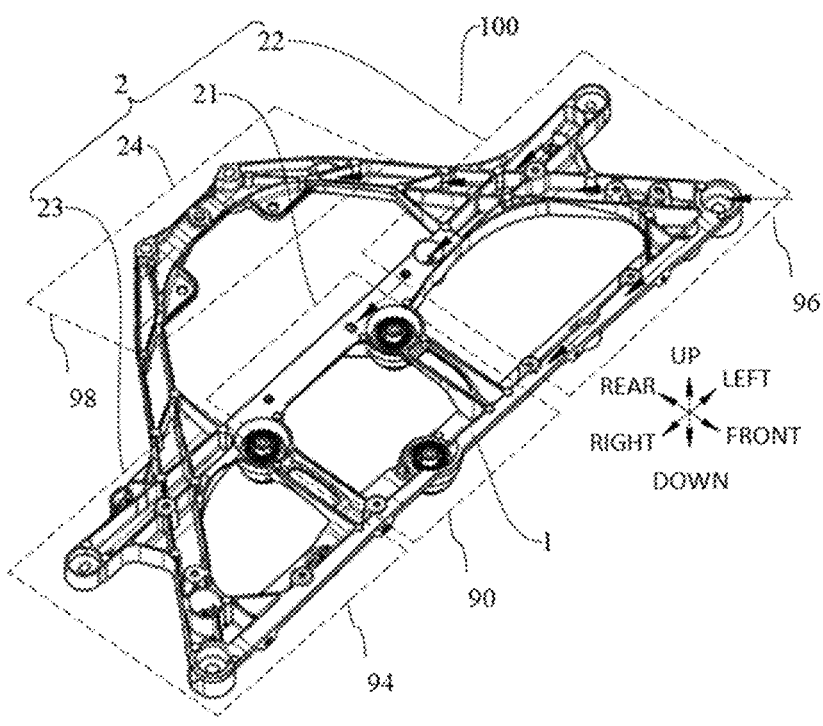
FIG. 1 is a first perspective view of an upper side of a mounting beam according to an embodiment of the present disclosure.

REFERENCE SYMBOLS mounting beam 100;

beam body 1; first cross beam 11; second cross beam 12; first oblique beam 13; second oblique beam 14; first joint 15; longitudinal beam 16; first longitudinal beam 161; second longitudinal beam 162; second joint 17; third joint 18; first rib group 19; second rib group 110; third rib group 111; fourth rib group 112; vertical rib 113;

mounting area 2; first mounting area 21; first mounting point 211; second mounting area 22; second mounting point 221; third mounting area 23; third mounting point 231; fourth mounting area 24; fourth mounting point 241;

left shock absorber tower 200;
right shock absorber tower 300;
dash panel 400; mounting base 401.

DETAILED DESCRIPTION

Embodiments of the present disclosure will be described in detail herein, examples of which are illustrated in the accompanying drawings. The embodiments described below with reference to the drawings are exemplary and are intended to explain the present disclosure, but not to be construed as limiting the present disclosure.

In the related art, there are some problems in the front cabin area of the vehicles, e.g., crash energy cannot be efficiently dispersed and transmitted, and degree of integrated design needs to be further improved.

A mounting beam (hereinafter referred to as the mounting beam 100) for a vehicle according to embodiments of the present disclosure includes a beam body 1, the beam body 1 may have a triangular structure, and the beam body 1 may be divided into a plurality of mounting areas 2, as illustrated in FIG. 1, there are four mounting areas 2, and the four mounting areas 2 may be divided into two rows in a front-rear direction. There may be three mounting areas 2 in a front row, and the three mounting areas 2 are a first mounting area 21, a second mounting area 22 and a third mounting area 23 respectively. There may be only one mounting area 2 in a rear row, and this mounting area 2 is a fourth mounting area 24.

In use, the mounting beam 100 is assembled in a compartment of the front cabin of the vehicle, and different front cabin accessories (a compressor 90, a cooling module 94, etc.) may be mounted in respective mounting areas 2 on the beam body 1, so that the accessories in the front cabin can be integrated, which is beneficial to simplifying mounting structure in the front cabin and improving space utilization rate.

Figure 2:
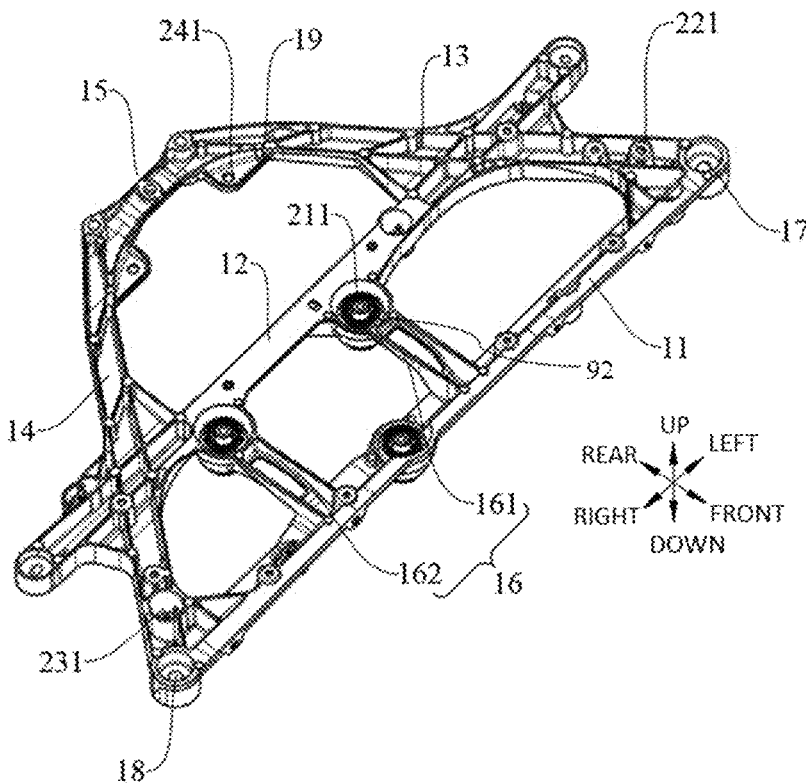
FIG. 2 is a second perspective view of an upper side of a mounting beam according to an embodiment of the present disclosure.
Figure 3:
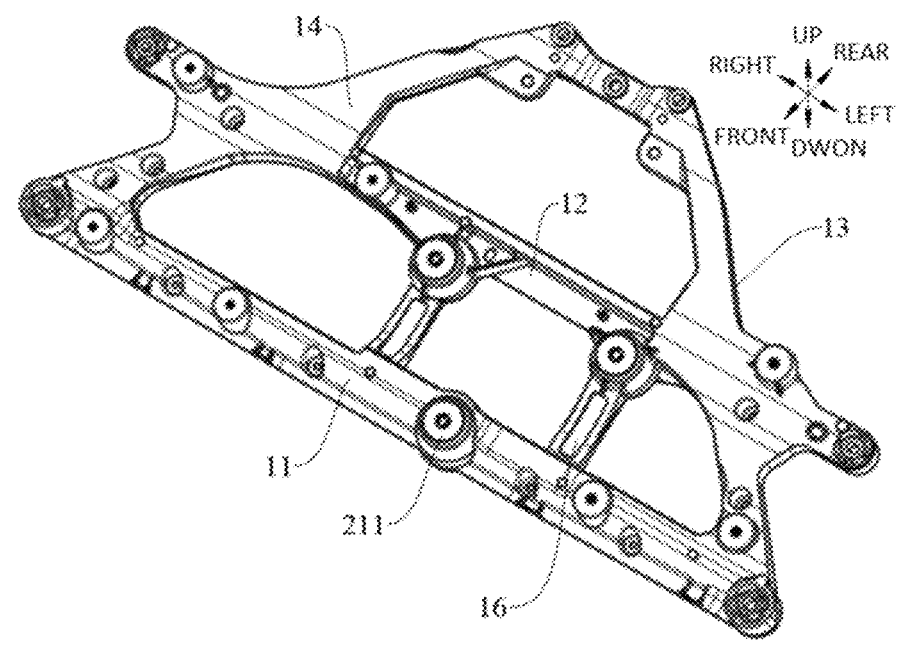
FIG. 3 is a perspective view of a lower side of a mounting beam according to an embodiment of the present disclosure.

As illustrated in FIG. 2, the beam body 1 includes a first cross beam 11, a second cross beam 12, a first oblique beam 13 and a second oblique beam 14. The first cross beam 11, the second cross beam 12, a first longitudinal beam 161 and a second longitudinal beam 162 may all be straight. The first cross beam 11 and the second cross beam 12 are arranged in parallel and spaced from each other. For example, both the first cross beam 11 and the second cross beam 12 extend in a left-right direction, and the first cross beam 11 is located at a front side of the second cross beam 12.

When assembling the mounting beam 100, a left end of the first cross beam 11 may be fixedly coupled to a left shock absorber tower 200 in the front cabin, and a right end of the first cross beam 11 may be fixedly coupled to a right shock absorber tower 300 in the front cabin. A left end of the second cross beam 12 may be fixedly coupled to the left shock absorber tower 200 in the front cabin, and a right end of the second cross beam 12 may be fixedly coupled to the right shock absorber tower 300 in the front cabin.

Each of first oblique beam 13 and the second oblique beam 14 intersects with the second cross beam 12. A first end of the first oblique beam 13 and a first end of the second oblique beam 14 are coupled to the first cross beam 11, and a second end of the first oblique beam 13 is coupled to a second end of the second oblique beam 14 to form a first joint 15, which is configured to be coupled to a dash panel 400.

For example, as illustrated in FIG. 2, the first oblique beam 13 and the second oblique beam 14 may be arranged in a splayed shape. The first oblique beam 13 may extend generally in a direction from front left to rear right, and the second oblique beam 14 may extend generally in a direction from front right to rear left. A front end of the first oblique beam 13 may be coupled to the first cross beam 11, a rear end of the first oblique beam 13 may be coupled to a rear end of the second oblique beam 14, and a front end of the second oblique beam 14 may be coupled to the first cross beam 11.

The second cross beam 12 may be integrally formed with the first oblique beam 13 and the second oblique beam 14, and form a triangular structure with the first oblique beam 13 and the second oblique beam 14. The first cross beam 11, the first oblique beam 13 and the second oblique beam 14 may form another triangular structure. Thus, the beam body 1 forms a consecutive double-layer triangular frame structure.

When the vehicle is subjected to a small offset crash, as illustrated by black arrows in FIG. 1, a crash force may be transmitted along the first cross beam 11, and the first oblique beam 13 and the second cross beam 12, so that the beam body 1 can effectively disperse crash energy. In addition, the double-layer triangular frame structure can improve structural strength and stability of the beam body 1.

It should be noted that, as illustrated in FIGS. 1 to 4, the beam body 1 may be generally symmetrical, and a symmetry axis of the beam body 1 extends generally in the front-rear direction and may pass through midpoints of the first cross beam 11 and the second cross beam 12, thereby ensuring balance of structure and stress of left and right sides of the beam body 1.

In the mounting beam 100 according to embodiments of the present disclosure, the first cross beam 11 and the second cross beam 12 can form two cross beam connection paths of the vehicle, so that the cross beam rigidity and torsional rigidity of the front cabin can be greatly improved, and driving safety is improved.

Secondly, the double-layer triangular frame structure of the beam body 1 can play a good role in dispersing crash energy, and combined with unique stability of the triangle, it also makes the structural strength of the beam body 1 higher and more stable.

Additionally, by arranging a plurality of mounting areas 2 on the beam body 1, some accessories in the front cabin can be integrated on the mounting beam 100 in a classified manner, so that the mounting beam 100 is highly integrated, so that on the one hand, the number of parts and components of the mounting structure in the front cabin can be reduced to facilitate lightweight of design of the front cabin, and on the other hand, the overall assembly efficiency can be improved. When assembling, the accessories can be assembled on corresponding sub-assembly lines, and then assembled on the mounting beam 100 on a final assembly line, which is beneficial to improving mounting accuracy and mounting cycle time of the final assembly line, and improving production efficiency.

In some embodiments, the beam body 1 includes a plurality of longitudinal beams 16, the plurality of longitudinal beams 16 is all coupled between the first cross beam 11 and the second cross beam 12, and the plurality of longitudinal beams 16 is spaced apart from each other a transverse direction of the beam body 1.

For example, as illustrated in FIG. 2, the longitudinal beams 16 may be arranged in a space surrounded by the first cross beam 11, the second cross beam 12, the first longitudinal beam 161 and the second longitudinal beam 162, and there may be two, three, four, five or more longitudinal beams 16, and the plurality of longitudinal beams 16 may be arranged in parallel and spaced apart from each other along the left-right direction, and each longitudinal beam 16 may extend along the front-rear direction, and a front end of each longitudinal beam 16 may be coupled and fixed to the first cross beam 11, and a rear end of each longitudinal beam 16 may be coupled and fixed to the second cross beam 12.

On the one hand, the longitudinal beam 16 can couple the first cross beam 11 to the second cross beam 12, which can further improve the structural strength and stability of the beam body 1; on the other hand, the longitudinal beam 16 can also form a force transmission path, which is beneficial to dissipation of crash energy and safety improvement.

In some embodiments, the plurality of longitudinal beams 16 includes a first longitudinal beam 161 and a second longitudinal beam 162, and the first longitudinal beam 161, the second longitudinal beam 162, the first cross beam 11, and the second cross beam 12 form a rectangular structure, and the rectangular structure forms the first mounting area 21, and the front cabin accessory include a compressor 90, and the compressor 90 is assembled at the rectangular structure.

For example, as illustrated in FIG. 2, only two longitudinal beams 16 may be provided, and the two longitudinal beams 16 are the first longitudinal beam 161 and the second longitudinal beam 162 respectively. The first longitudinal beam 161 may be located at a left side of the second longitudinal beam 162. The first longitudinal beam 161, the second longitudinal beam 162, the first cross beam 11, and the second cross beam 12 can form a rectangular structure. As illustrated in FIG. 1, the rectangular structure can form a mounting area 2 (the first mounting area 21). When assembling, the compressor 90 of an air conditioner can be directly fixed on bottom of the first mounting area 21.

It should be noted that in the related art, the air-conditioning compressor 90 is generally fixed on an adapter bracket through a damping bushing 92, and then the adapter bracket is bolted and fixed on a coupling beam. Compared with a mounting mode of the compressor 90 in the related art, in this embodiment, the adapter bracket is eliminated, and the air-conditioning compressor 90 is directly fixed between the first cross beam 11 and the second cross beam 12 of the mounting beam 100. At the same time, two longitudinal beams 16 are designed between the two cross beams to form a rectangular structure, which greatly improves dynamic rigidity and NVH mode of the air-conditioning compressor 90.

In some embodiments, the rectangular structure is provided with a plurality of first mounting points 211, the plurality of first mounting points is arranged along a circumferential direction of the rectangular structure and spaced apart from each other, and the compressor 90 is coupled to the plurality of first mounting points 211. As illustrated in FIG. 2, each of the first mounting points 211 may be a hole-like coupling structure, and the number of the first mounting points 211 may be three, four, five, etc. The plurality of first mounting points 211 can be arranged along the circumferential direction of the rectangular structure and spaced apart from each other, thus ensuring strength of an assembly structure of the compressor 90 and the beam body 1.

In some embodiments, as illustrated in FIG. 2, there may be three first mounting points 211, and there may be one first mounting point 211 at a joint of the first longitudinal beam 161 and the second cross beam 12, a joint of the second longitudinal beam 162 and the second cross beam 12, and a portion of the first cross beam 11 between the first longitudinal beam 161 and the second longitudinal beam 162. Thus, the three first mounting points 211 can form a triangular structure, thereby ensuring structural stability of fixation of the compressor 90.

In some examples, the rectangular structure is provided with a plurality of damping bushings 92, the plurality of damping bushings 92 is arranged at the plurality of first mounting points in one-to-one correspondence, and the compressor 90 is assembled at the rectangular structure through the damping bushings 92. Therefore, an effect of buffering and damping the compressor 90 can be achieved, and rigid contact between the compressor 90 and the beam body 1 can be avoided.

In some embodiments, the plurality of mounting areas 2 includes a second mounting area 22 and a third mounting area 23, the first mounting area 21 is located between the second mounting area 22 and the third mounting area 23, and the second mounting area 22, the first mounting area 21 and the third mounting area 23 are sequentially arranged in the transverse direction of the beam body.

For example, as illustrated in FIGS. 1 and 2, the second mounting area 22 may be located at a left side of the first mounting area 21, and the first mounting area 21 may be formed by part of the first cross beam 11, part of the second cross beam 12 and part of the first oblique beam 13 at a left side of the first longitudinal beam 161. The third mounting area 23 may be located at a right side of the first mounting area 21, and the third mounting area 23 may be formed by part of the first cross beam 11, part of the second cross beam 12 and part of the second oblique beam 14 at a right side of the second longitudinal beam 162.

The front cabin accessory includes a cooling module 94 and an expansion tank 96, one of the second mounting area 22 and the third mounting area 23 is configured to mount the cooling module 94, and the other is configured to mount the expansion tank 96. Specifically, the expansion tank 96 may be mounted at the second mounting area 22 and the cooling module 94 may be mounted at the third mounting area 23.

Moreover, a front half of the beam body 1 has a longer size in the left-right direction, and the front half of the beam body 1 is divided into the first mounting area 21, the second mounting area 22 and the third mounting area 23, thus the space on the beam body 1 can be fully utilized, the utilization rate can be improved, and the integrated arrangement of the front cabin accessory can be facilitated.

In some embodiments, the second mounting area 22 is provided with a plurality of second mounting points 221, the plurality of second mounting points 221 is arranged along the circumferential direction of the second mounting area 22 and spaced apart from each other; and the third mounting area 23 is provided with a plurality of third mounting points 231, and the plurality of third mounting points 231 is arranged along the circumferential direction of the third mounting area 23 and spaced apart from each other.

Specifically, there may be three, four, five or more second mounting points 221, and the plurality of second mounting points 221 may be uniformly distributed on the first cross beam 11, the second cross beam 12 and the first longitudinal beam 161. Similarly, there may be three, four, five or more third mounting points 231, and the plurality of third mounting points 231 may be uniformly distributed on the first cross beam 11, the second cross beam 12 and the second longitudinal beam 162.

Therefore, on the one hand, the strength of the assembly structure of the expansion tank 96 (cooling module 94) and the beam body 1 can be enhanced, and on the other hand, the vibration of the expansion tank 96 (cooling module 94) can be directly transmitted to different beams, thus facilitate alleviation of the vibration of the expansion tank 96.

In some embodiments, the plurality of mounting areas 2 includes a fourth mounting area 24, and the fourth mounting area 24 is arranged at a side of the second cross beam 12 facing away from the first cross beam 11 and adjacent to the first joint 15.

For example, as illustrated in FIG. 1, the fourth mounting area 24 is provided at a rear side of the beam body 1, and a rear end portion of the first oblique beam 13 and a rear end portion of the second oblique beam 14 form the fourth mounting area 24. The front cabin accessory may include an air conditioner motor body 98, and the air-conditioning motor body may be assembled at the fourth mounting area 24, further enhancing the integrated arrangement of the front cabin accessory and the mounting beam 100.

In some embodiments, the fourth mounting area 24 may be provided with a plurality of fourth mounting points 241, specifically three, four, five, six and the like, and the plurality of fourth mounting points 241 is arranged along the circumferential direction of the fourth mounting area 24 and spaced apart from each other. So that the structural strength of the assembly of the motor body and the beam body 1 of the air conditioner can be enhanced.

In some examples, there may be two fourth mounting points 241, and an inner side of a rear end of each of the first oblique beam 13 and the second oblique beam 14 may be provided with an ear plate, and the two ear plates respectively form the two fourth mounting points 241.

In some embodiments, the first end of the first oblique beam 13 is coupled to the first end of the first cross beam 11 to form a second joint 17, the second joint 17 is configured to be coupled to the left shock absorber tower 200; the first end of the second oblique beam 14 is coupled to the second end of the first cross beam 11 to form a third joint 18, and the third joint 18 is configured to be coupled to the right shock absorber tower 300.

For example, as illustrated in FIG. 2, the front end of the first oblique beam 13 may be coupled to the left end of the first cross beam 11 to form the second joint 17, and the front end of the second oblique beam 14 may be coupled to the right end of the first cross beam 11 to form the third joint 18, so that the front end of the first oblique beam 13 and the left end of the first cross beam 11 can share a mounting point and be fixedly coupled to the left shock absorber tower 200 at the same time, and the front end of the second oblique beam 14 and the right end of the first cross beam 11 can share a mounting point and be fixedly coupled to the right shock absorber tower 300 at the same time.

On the one hand, the structural strength of the joint between the beam body 1 and the shock absorber tower can be enhanced, and on the other hand, the force exerted by the shock absorber tower on the beam body 1 can be decomposed to the first cross beam 11 and the first oblique beam 13 (the second oblique beam 14), further improving the force decomposition effect.

In some embodiments, the beam body 1 is made of aluminum, and the beam body 1 is integrally die-cast. Specifically, the first cross beam 11, the second cross beam 12, the first oblique beam 13, the second oblique beam 14, and the plurality of longitudinal beams 16 can all be processed and formed by high-pressure aluminum casting. Thus, on the one hand, the continuity and structural strength of the joint of each beam can be ensured, and on the other hand, the aluminum material is light, which can realize the lightweight of the beam body 1.

Figure 7:
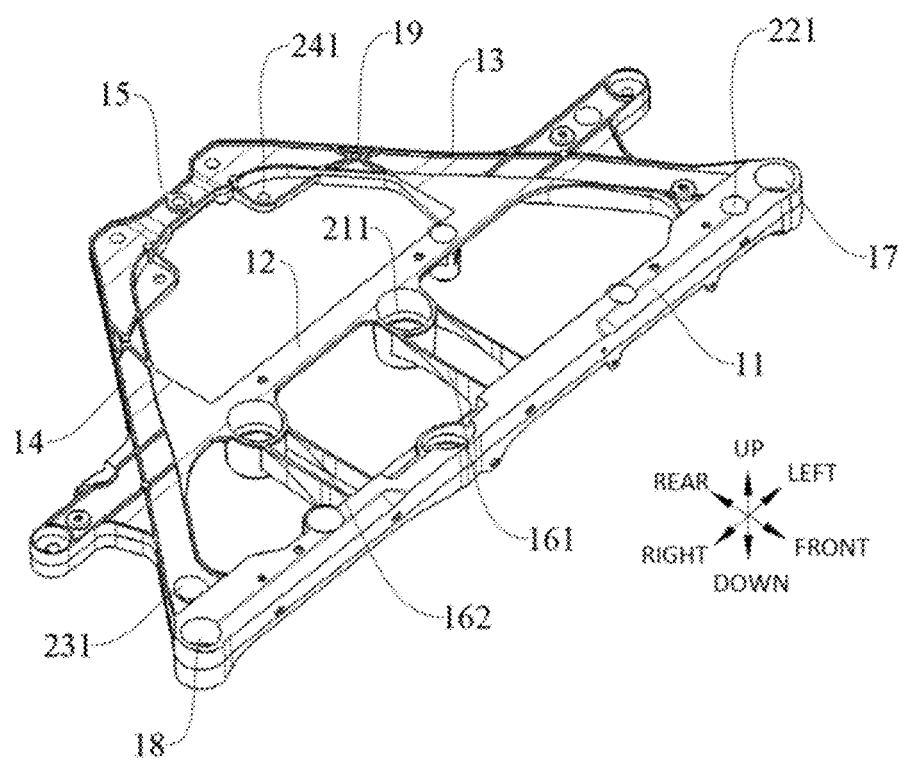
FIG. 7 is a perspective view of an upper side of a mounting beam according to another embodiment of the present disclosure.
Figure 8:
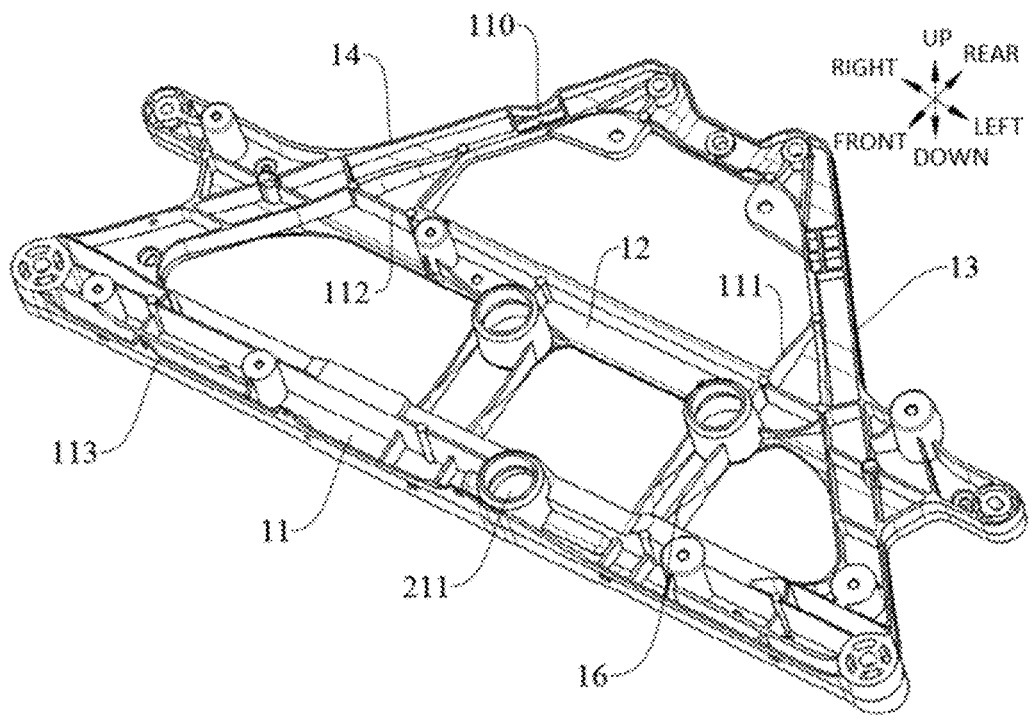
FIG. 8 is a perspective view of a lower side of a mounting beam according to another embodiment of the present disclosure.

In some embodiments, a top face of the first oblique beam 13 and/or a top face of the second oblique beam 14 is provided with a first rib group 19, and the first rib group 19 is located between the first joint 15 and the second cross beam 12. For example, as illustrated in FIGS. 7 and 8, the first rib group 19 can be an X-shaped structure composed of two reinforcing ribs, and both the top face of the first oblique beam 13 and the top face of the second oblique beam 14 may be integrally formed with a first rib group 19.

A bottom face of the first oblique beam 13 and/or a bottom face of the second oblique beam 14 is provided with a second rib group 110, and the second rib group 110 is located between the first joint 15 and the second cross beam 12. For example, as illustrated in FIG. 8, both the bottom face of the first oblique beam 13 and the bottom face of the second oblique beam 14 may be provided with a second rib group 110, and the second rib group 110 may have a grid-shaped structure composed of a plurality of reinforcing ribs.

The first oblique beam 13 and/or the second oblique beam 14 are provided with a notch for avoiding a wiper envelope, and the first rib group 19 and the second rib group 110 can be arranged at the notch of the first oblique beam 13 or the second oblique beam 14, and the first rib group 19 and the second rib group 110 on the same oblique beam can be arranged opposite to each other in an up-down direction. Therefore, it can compensate for the structural weakness caused by the notch formed by avoiding the wiper envelope, ensure the structural strength of the beam body 1, and meet the use requirements. Secondly, it can also improve the bearing capacity of the structure in the process of crash and improve the safety of the vehicle.

In some embodiments, a third rib group 111 is arranged at an included angle formed by the first oblique beam 13 and the second cross beam 12. Specifically, as illustrated in FIG. 8, the third rib group 111 may be arranged in an acute angle formed by the first oblique beam 13 and the second cross beam 12, and the first oblique beam 13, the second cross beam 12 and the third rib group 111 form a triangular structure. Thus, the rigidity of the joint between the first oblique beam 13 and the second cross beam 12 can be improved.

In some embodiments, a fourth rib group 112 is arranged at an included angle formed by the second oblique beam 14 and the second cross beam 12. Specifically, as illustrated in FIG. 8, the fourth rib group 112 may be arranged in an acute angle formed by the second oblique beam 14 and the second cross beam 12, and the second oblique beam 14, the second cross beam 12 and the fourth rib group 112 form a triangular structure. Therefore, the rigidity of the joint between the second oblique beam 14 and the second cross beam 12 can be improved.

Figure 4:
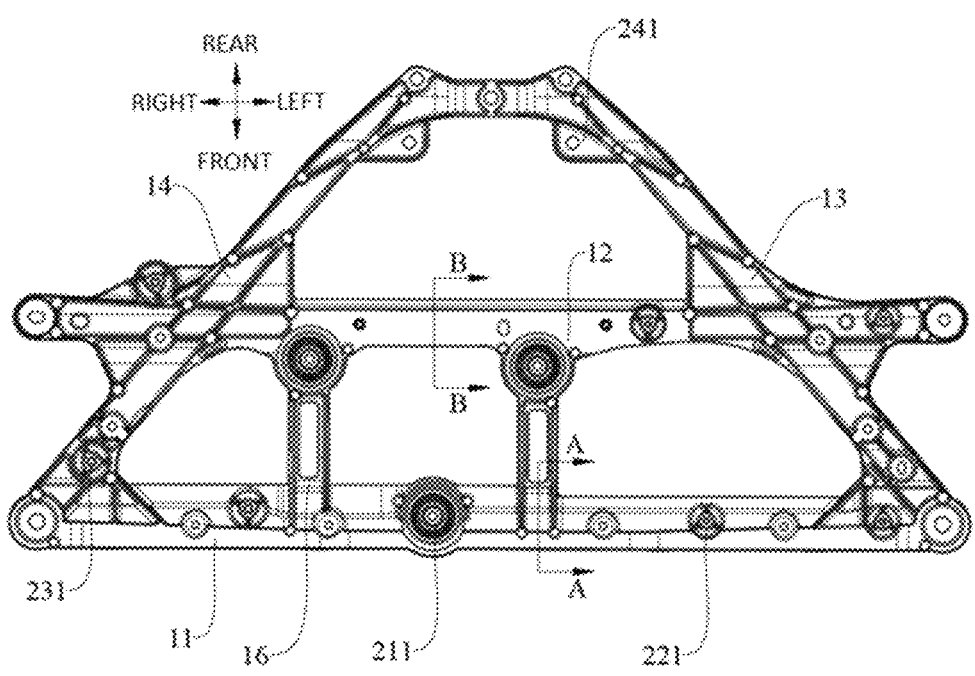
FIG. 4 is a schematic top view of a mounting beam according to an embodiment of the present disclosure.
Figure 5:
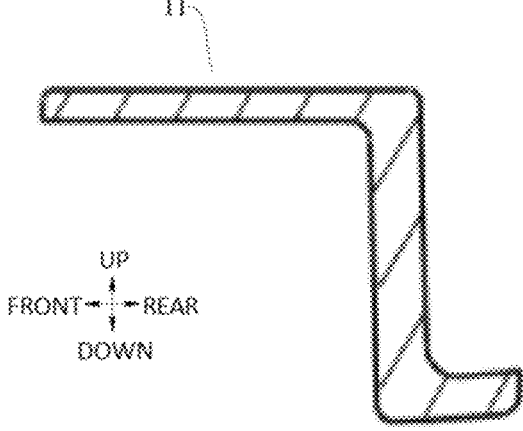
FIG. 5 is a schematic sectional view taken along A-A in FIG. 4.
Figure 6:
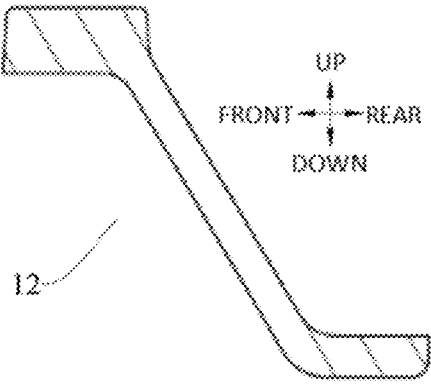
FIG. 6 is a schematic cross-sectional view taken along B-B in FIG. 4.

In some embodiments, as illustrated in FIGS. 4 and 5, a cross section of the first cross beam 11 has a Z shape. As illustrated in FIGS. 4 and 6, a cross section of the second cross beam 12 has a Z shape. Therefore, the bending resistance of the second cross beam 12 can be improved while satisfying the die casting process of the first cross beam 11 and the second cross beam 12. The structural reinforcement of the first cross beam 11 and the second cross beam 12 is also conducive to improving the rigidity of the compressor mounting point, reducing the compressor excitation noise and improving the vehicle comfort.

In some embodiments, a plurality of vertical ribs 113 are uniformly distributed on the top face and the bottom face of the beam body 1, and at least part of the vertical ribs 113 fluctuate in an extending direction of the vertical ribs 113. Specifically, as illustrated in FIG. 8, the vertical ribs 113 may be integrally formed on the bottom face of the beam body 1, and the vertical ribs 113 may include an annular rib and a linear rib. The annular rib may extend along an inner edge and an outer edge of the beam body 1 to form a closed loop. A plurality of linear ribs may be provided, and corresponding linear ribs may extend along the first oblique beam 13, the second oblique beam 14, the first cross beam 11, the second cross beam 12 and each longitudinal beam 16. Therefore, the structural strength and rigidity of the beam body 1 can be enhanced.

It should be noted that a height size of each vertical rib 113 in the up-down direction can fluctuate along the extending direction of the vertical ribs 113, and the fluctuation may be determined by topology optimization design, so that the reinforced part (higher part) of the vertical ribs 113 can correspond to a relatively weak area of the beam body 1, and the reinforced position of the vertical ribs 113 is more targeted, which is also beneficial to reducing material consumption of the vertical ribs 113, and realizing the light-weight design while improving the performance requirements.

In some embodiments, as illustrated in FIGS. 1 to 4, the fillet transition design may be carried out at an included angle formed by any two beams. For example, the fillet transition may be carried out at the acute angle formed by the first oblique beam 13 and the first cross beam 11, and a corresponding fillet diameter may be 60 mm. The fillet transition may also be carried out at the acute angle formed by the second oblique beam 14 and the first cross beam 11, and a corresponding fillet diameter may also be 60 mm. It can improve the structural strength and rigidity of the joint of two beams and avoid stress concentration.

Next, the front cabin assembly according to embodiments of the present disclosure will be described.

Figure 9:
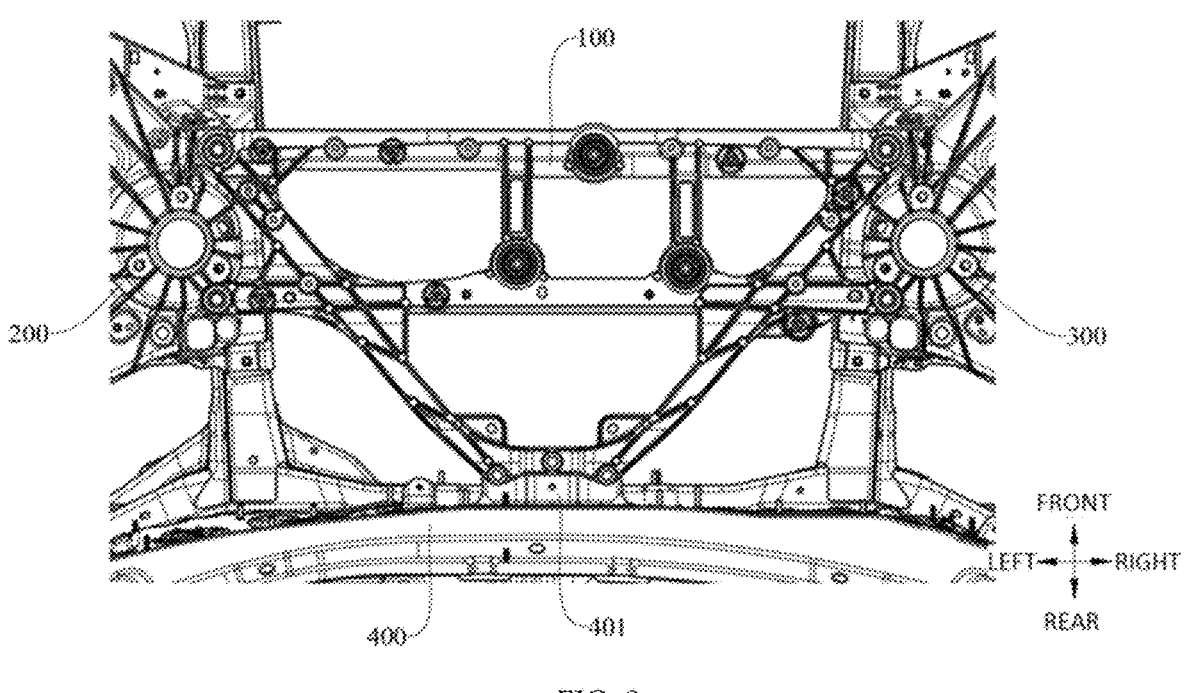
FIG. 9 is a partial schematic diagram of a front cabin assembly according to an embodiment of the present disclosure.

The front cabin assembly according to embodiments of the present disclosure includes a mounting beam 100, and the mounting beam 100 may be the mounting beam 100 described in any of the above embodiments. As illustrated in FIG. 9, the front cabin assembly includes a left shock absorber tower 200 and a right shock absorber tower 300. A left end of the first cross beam 11 and a left end of the second cross beam 12 are coupled to the left shock absorber tower 200, and a right end of the first cross beam 11 and a right end of the second cross beam 12 are coupled to the right shock absorber tower 300.

A center point (which may be seen as an axis) of the left shock absorber tower 200 is located between the left end of the first cross beam 11 and the left end of the second cross beam 12, and a center point (which may be seen as an axis) of the right shock absorber tower 300 is located between the right end of the first cross beam 11 and the right end of the second cross beam 12. Therefore, the rigidity of the mounting point of the left shock absorber tower 200 (or right shock absorber tower 300) in the transverse direction (left-right direction) can be improved.

In some embodiments, the front cabin assembly includes a front cabin accessory, the front cabin accessory is assembled to the corresponding mounting area 2 of the beam body 1, and the front cabin accessory includes at least one of the following: a compressor 90, a cooling module 94, an expansion tank 96 or an air conditioner motor body 98. The compressor 90 may be fixed at the first mounting area 21, the expansion tank 96 may be fixed at the second mounting area 22, the cooling module 94 may be fixed at the third mounting area 23, and the air conditioner motor body 98 may be fixed at the fourth mounting area 24.

In some embodiments, as illustrated in FIG. 9, the front cabin assembly further includes a dash panel 400, and the first joint 15 is fixedly coupled to the dash panel 400. A front side of the dash panel 400 may be provided with a mounting base 401, and a rear end of the beam body 1 may be overlapped on the mounting base 401 and fixedly coupled to the mounting base 401.

A vehicle according to embodiments of the present disclosure will be described below.

The vehicle according to embodiments of the present disclosure includes a front cabin assembly, and the front cabin assembly may be the front cabin assembly described in any of the above embodiments. The vehicle may be a saloon, an SUV, a pickup truck, a bus etc., and of course it may also be other vehicles with front cabin assemblies.

An optimization design method for a mounting beam according to embodiments of the present disclosure will be described below.

The optimization design method for the mounting beam 100 according to embodiments of the present disclosure includes the following steps:

S1: a body-in-white model with a design space for a mounting beam 100 is created. For example, a body-in-white model including the whole design space of the reinforcing beam may be made according to the position and arrangement space of each mounting point of the mounting beam 100, and the model can be a finite element model.

S2: an optimal force transmission path of the mounting beam 100 in the design space is determined through topology optimization. For example, topology optimization can be carried out by considering the dynamic rigidity of the compressor mounting point, the bending and torsion rigidity of the whole vehicle and the local modal performance of the mounting beam 100, so that the optimal force transmission path of the mounting beam 100 in the design space can be obtained. The optimal force transmission path should be able to meet the dynamic rigidity performance and lightweight design at the same time. Structural size and process constraints can be considered during topology optimization, so that the optimized structure can meet the process requirements.

S3: an initial model of the mounting beam 100 is created according to the optimal force transmission path. For example, the product design engineer can make the structure (initial model) of the mounting beam 100 that reflects the topology optimization path according to the optimal force transmission path from topology optimization, in combination with the requirements of process and assembly arrangement. It should be noted that in the process of creating the initial model, the thickness of the mounting beam 100 should be optimized in combination with the factors such as NVH dynamic rigidity, vehicle body bending and torsion rigidity, and safety crash performance, so as to obtain a lightweight structure that meets various performances.

S4: an optimization design for a specific structure of the initial model is performed and a final model of the mounting beam 100 is obtained.

The optimization design for the specific structure may include the optimization design of sections of the first cross beam 11 and the second cross beam 12. For example, the optimized cross-section design of the second cross beam 12 can be Z-shaped, so that the axial and bending bearing capacity of the beam can be improved, the noise generated by the excitation of the compressor 90 and transmitted to an occupant can be obviously reduced and the comfort of the vehicle can be improved.

The optimization design for the specific structure can also include optimization design for arrangement position and structure of the reinforcing structure on the beam body 1. For example, X-shaped and grid-shaped ribs can be designed on the beam body 1 according to the direction of crash force transmission, to improve bearing capacity of the beam, improve the sectional force during crash and improve the safety of the vehicle.

The optimization design for the specific structure can also include the optimization for the shape and thickness of the reinforcing ribs on the beam body 1. For example, arc-shaped ribs with variable thickness can be designed at each joint or corner, so that the weight of the parts can be reduced under the conditions of meeting the rigidity, NVH and safety performance, and the weight and cost of the parts can be reduced.

Embodiments of the present disclosure also provide a front cabin assembly employing the above-described mounting beam.

Embodiments of the present disclosure also provide a vehicle employing the above-described front cabin assembly.

Embodiments of the present disclosure also provide an optimization design method for the above-described mounting beam.

The vehicle mounting beam for the vehicle according to embodiments of the present disclosure includes a beam body. The beam body is provided with a plurality of mounting areas configured to mount a front cabin accessory, and the beam body includes:

a first cross beam and a second cross beam, the first cross beam and the second cross beam being arranged in parallel and spaced apart from each other, and each of the first cross beam and the second cross beam being configured to be coupled between a left shock absorber tower and a right shock absorber tower;

a first oblique beam and a second oblique beam, each of the first oblique beam and the second oblique beam interesting with the second cross beam, a first end of the first oblique beam and a first end of the second oblique beam are coupled to the first cross beam, and a second end of the first oblique beam is coupled to a second end of the second oblique beam to form a first joint configured to be coupled to a dash panel.

The mounting beam according to embodiments of the present disclosure can improve the torsional rigidity of the whole vehicle, effectively decompose the crash energy, and realize the integration of accessory mounting.

In some embodiments, the beam body includes a plurality of longitudinal beams, the plurality of longitudinal beams is coupled between the first cross beam and the second cross beam, and spaced apart from each other along a transverse direction of the beam body.

In some embodiments, the plurality of longitudinal beams includes a first longitudinal beam and a second longitudinal beam, and the first longitudinal beam, the second longitudinal beam, the first cross beam and the second cross beam form a rectangular structure, and the rectangular structure forms a first mounting area; and the front cabin accessory includes a compressor, and the compressor is assembled at the rectangular structure.

In some embodiments, the rectangular structure is provided with a plurality of first mounting points, the plurality of first mounting points is arranged along a circumferential direction of the rectangular structure and spaced apart from each other, and the compressor is coupled to the plurality of first mounting points.

In some embodiments, the first mounting point is arranged on a joint of the first longitudinal beam and the second cross beam, a joint of the second longitudinal beam and the second cross beam, and a portion of the first cross beam between the first longitudinal beam and the second longitudinal beam;

and/or the rectangular structure is provided with a plurality of damping bushings, the plurality of damping bushings is arranged at the plurality of first mounting points in one-to-one correspondence, and the compressor is assembled at the rectangular structure through the damping bushings.

In some embodiments, the plurality of mounting areas includes a second mounting area and a third mounting area, the first mounting area is located between the second mounting area and the third mounting area, and the second mounting area, the first mounting area and the third mounting area are sequentially arranged in the transverse direction of the beam body;

the front cabin accessory includes a cooling module and an expansion tank, one of the second mounting area and the third mounting area is configured to mount the cooling module, and the other is configured to mount the expansion tank.

In some embodiments, the second mounting area is provided with a plurality of second mounting points, and the plurality of second mounting points is arranged along a circumferential direction of the second mounting area and spaced apart from each other;

and/or the third mounting area is provided with a plurality of third mounting points, and the plurality of third mounting points is arranged along a circumferential direction of the third mounting area and spaced apart from each other.

In some embodiments, the plurality of mounting areas include a fourth mounting area, and the fourth mounting area is arranged at a side of the second cross beam facing away from the first cross beam and adjacent to the first joint;

the fourth mounting area is provided with a plurality of fourth mounting points, and the plurality of fourth mounting points is arranged along a circumferential direction of the fourth mounting area and spaced apart from each other;

and/or the front cabin accessory includes an air conditioner motor body, and the fourth mounting area is configured to mount the air conditioner motor body.

In some embodiments, the first end of the first oblique beam is coupled to a first end of the first cross beam to form a second joint, the second joint is configured to be coupled to the left shock absorber tower, the first end of the second oblique beam is coupled to a second end of the first cross beam to form a third joint, and the third joint is configured to be coupled to the right shock absorber tower.

In some embodiments, the beam body is integrally die-cast, and/or the beam body is made of aluminum.

In some embodiments, a top face of the first oblique beam and/or a top face of the second oblique beam is provided with a first rib group, and the first rib group is located between the first joint and the second cross beam;

and/or a bottom face of the first oblique beam and/or a bottom face of the second oblique beam is provided with a second rib group, and the second rib group is located between the first joint and the second cross beam.

In some embodiments, the first oblique beam and/or the second oblique beam is provided with a notch for avoiding a wiper envelope, and the first rib group and the second rib group are arranged at the notch;

and/or the first rib group has an X shape;

and/or the second rib group has a grid shape.

In some embodiments, a third rib group is arranged at an included angle formed by the first oblique beam and the second cross beam, and the first oblique beam, the second cross beam and the third rib group form a triangular structure;

and/or a fourth rib group is arranged at an included angle formed by the second oblique beam and the second cross beam, and the second oblique beam, the second cross beam and the fourth rib group form a triangular structure.

In some embodiments, a cross section of the first cross beam is Z-shaped, and/or a cross section of the second cross beam is Z-shaped.

In some embodiments, a plurality of vertical ribs is uniformly distributed on the top face and the bottom face of the beam body, and at least part of the vertical ribs fluctuate in an extending direction of the vertical ribs.

The front cabin assembly according to embodiments of the present disclosure includes a mounting beam as described in any of the above-described embodiments.

In some embodiments, the front cabin assembly includes:

a left shock absorber tower, a first end of the first cross beam and a first end of the second cross beam being coupled to the left shock absorber tower, and a center point of the left shock absorber tower being located between the first cross beam and the second cross beam; and a right shock absorber tower, a second end of the first cross beam and a second end of the second cross beam being coupled to the right shock absorber tower, and a center point of the right shock absorber tower being located between the first cross beam and the second cross beam.

In some embodiments, the front cabin assembly includes a front cabin accessory, the front cabin accessory is assembled at the mounting areas, and the front cabin accessory includes at least one of the following: a compressor, a cooling module, an expansion tank or an air conditioner motor body;

and/or includes a dash panel, and the first joint is fixedly coupled to the dash panel.

A vehicle according to embodiments of the present disclosure includes a front cabin assembly as described in any of the above embodiments.

An optimization design method for a mounting beam according to embodiments of the present disclosure includes the following steps:

creating a body-in-white model with a design space for the mounting beam;

determining an optimal force transmission path of the mounting beam in the design space through topology optimization;

creating an initial model of the mounting beam according to the optimal force transmission path; and performing an optimization design for a specific structure of the initial model and obtaining a final model of the mounting beam.

In some embodiments, the optimization design for the specific structure includes:

optimization design for sections of a first cross beam and a second cross beam;

and/or optimization design for arrangement position and structure of reinforcing structure on the beam body.

In the description of the present disclosure, it should be understood that, terms such as "central", "longitudinal", "transverse", "length", "width", "thickness", "up", "down", "front", "rear", "right", "left", "horizontal", "vertical", "top", "bottom", "inner", "outer", "clockwise", "anticlockwise", "axial", "radial" and "circumferential" etc., should be construed to refer to the orientation as then described or as illustrated in the drawings under discussion. These relative terms are for convenience of description and do not require that the present disclosure be constructed or operated in a particular orientation. Therefore, it should not be construed as limiting the present disclosure.

In addition, terms such as "first" and "second" are used herein for purposes of description and are not intended to indicate or imply relative importance or significance or the number of the features. Therefore, the features defined with "first" and "second" can include at least one of these features explicitly or implicitly. In the description of the present disclosure, "a plurality of" means at least two, such as two, three, etc., unless otherwise specifically defined.

In the present disclosure, unless specified or limited otherwise, the terms "mounted," "connected," "fixed," and "coupled" and variations thereof are used broadly, for example, for example, it can be fixedly connected, detachably connected, or integrated; can be mechanically connected, electrically connected or can communicate with each other; it can be directly connected or indirectly connected through an intermediate medium, and it can be the internal communication of two elements or the interaction between two elements, unless otherwise specified. For those skilled in the art, the specific meanings of the above terms in the present disclosure can be understood according to specific situations.

In the present disclosure, unless otherwise specified and limited, the first feature "above" or "below" the second feature may be the direct contact between the first and second features, or the indirect contact between the first and second features through an intermediary. Further, the first feature is "above", "on" and "on top of" the second feature, but the first feature is directly above or obliquely above the second feature, or it only means that the horizontal height of the first feature is higher than that of the second feature. The first feature "under", "below" and "on bottom of" the second feature may be the first feature directly under or obliquely under the second feature, or only indicate that the horizontal height of the first feature is smaller than that of the second feature.

Reference throughout this specification to "an embodiment." "some embodiments," "an example", "a specific example," or "some examples," means that a particular feature, structure, material, or characteristic described in connection with the embodiment or example is included in at least one embodiment or example of the present disclosure. Thus, the appearances of the phrases in various places throughout this specification are not necessarily referring to the same embodiment or example of the present disclosure. Furthermore, the particular features, structures, materials, or characteristics may be combined in any suitable manner in one or more embodiments or examples. In addition, those skilled in the art can combine different embodiments or examples and features of different embodiments or examples described in this specification without contradicting each other.

Although explanatory embodiments have been illustrated and described, it should be understood that the above embodiments are illustrative and should not be construed as limitations of the present disclosure. Changes, modifications, substitutions and variations of the above-mentioned embodiments by those skilled in the art are within the scope of protection of the present disclosure.

What is claimed is:

1. A mounting beam for a vehicle, comprising:
a beam body, the beam body being provided with a plurality of mounting areas, and the plurality of mounting areas being configured to mount a front cabin accessory, and the beam body comprising:
a first cross beam and a second cross beam, the first cross beam and the second cross beam being arranged in parallel and spaced apart from each other, and each of the first cross beam and the second cross beam being configured to be coupled between a left shock absorber tower and a right shock absorber tower; and
a first oblique beam and a second oblique beam, each of the first oblique beam and the second oblique beam intersecting with the second cross beam, a first end of the first oblique beam and a first end of the second oblique beam being coupled to the first cross beam, a second end of the first oblique beam being coupled to a second end of the second oblique beam to form a first joint, and the first joint being configured to be coupled to a dash panel,
wherein the beam body comprises a plurality of longitudinal beams, and the plurality of longitudinal beams is coupled between the first cross beam and the second cross beam and spaced apart from each other along a transverse direction of the beam body; and
the plurality of longitudinal beams comprises a first longitudinal beam and a second longitudinal beam, the first longitudinal beam, the second longitudinal beam, the first cross beam and the second cross beam form a rectangular structure, and the rectangular structure forms a first mounting area; and the front cabin accessory comprises a compressor, and the compressor is assembled at the rectangular structure.

2. The vehicle mounting beam according to claim 1, wherein the rectangular structure is provided with a plurality of first mounting points, the plurality of first mounting points is arranged along a circumferential direction of the rectangular structure and spaced apart from each other, and the compressor is coupled to the plurality of first mounting points.

3. The vehicle mounting beam according to claim 2, wherein the plurality of first mounting points are arranged on a joint of the first longitudinal beam and the second cross beam, a joint of the second longitudinal beam and the second cross beam, and a portion of the first cross beam between the first longitudinal beam and the second longitudinal beam, respectively;
and/or the rectangular structure is provided with a plurality of damping bushings, the plurality of damping bushings is arranged at the plurality of first mounting points in one-to-one correspondence, and the compressor is assembled at the rectangular structure through the plurality of damping bushings.

4. The vehicle mounting beam according to claim 1, further comprising a second mounting area and a third mounting area, the first mounting area is located between the second mounting area and the third mounting area, and the second mounting area, the first mounting area and the third mounting area are sequentially arranged in the transverse direction of the beam body; and
the front cabin accessory comprises a cooling module and an expansion tank, one of the second mounting area and the third mounting area is configured to mount the cooling module, and the other is configured to mount the expansion tank.

5. The vehicle mounting beam according to claim 4, wherein the second mounting area is provided with a plurality of second mounting points, the plurality of second mounting points is arranged along a circumferential direction of the second mounting area and spaced apart from each other;
and/or the third mounting area is provided with a plurality of third mounting points, the plurality of third mounting points is arranged along a circumferential direction of the third mounting area and spaced apart from each other.

6. The vehicle mounting beam according to claim 5, further comprising a fourth mounting area, the fourth mounting area is arranged at a side of the second cross beam facing away from the first cross beam and adjacent to the first joint;
the fourth mounting area is provided with a plurality of fourth mounting points, the plurality of fourth mounting points is arranged along a circumferential direction of the fourth mounting area and spaced apart from each other;
and/or the front cabin accessory comprises an air conditioner motor body, and the fourth mounting area is configured to mount the air conditioner motor body.

7. The vehicle mounting beam according to claim 1, wherein the first end of the first oblique beam is coupled to a first end of the first cross beam to form a second joint, the second joint is configured to be coupled to the left shock absorber tower, the first end of the second oblique beam is coupled to a second end of the first cross beam to form a third joint, and the third joint is configured to be coupled to the right shock absorber tower.

8. The vehicle mounting beam according to claim 1, wherein the beam body is integrally die-cast, and/or the beam body is made of aluminum.

9. The vehicle mounting beam according to claim 1, wherein at least one of a top face of the first oblique beam or a top face of the second oblique beam is provided with a first rib group, and the first rib group is located between the first joint and the second cross beam;
and/or at least of a bottom face of the first oblique beam or a bottom face of the second oblique beam is provided with a second rib group, and the second rib group is located between the first joint and the second cross beam.

10. The vehicle mounting beam according to claim 9, wherein the first oblique beam and/or the second oblique beam are provided with a notch for avoiding a wiper envelope, and the first rib group and the second rib group are arranged at the notch;
and/or the first rib group has an X shape;
and/or the second rib group has a grid shape.

11. The vehicle mounting beam according to claim 9, wherein a third rib group is arranged at an included angle formed by the first oblique beam and the second cross beam, and the first oblique beam, the second cross beam and the third rib group form a triangular structure.

12. The vehicle mounting beam according to claim 11, wherein a fourth rib group is arranged at an included angle formed by the second oblique beam and the second cross beam, and the second oblique beam, the second cross beam and the fourth rib group form a triangular structure.

13. The vehicle mounting beam according claim 1, wherein at least one of a cross section of the first cross beam or a cross section of the second cross beam has a Z shape.

14. The vehicle mounting beam according to claim 1, wherein a plurality of vertical ribs is uniformly distributed on a top face and a bottom face of the beam body, and at least part of the plurality of vertical ribs fluctuate in an extending direction of the plurality of vertical ribs.

15. A front cabin assembly, comprising:
a left shock absorber tower;
a right shock absorber tower;
a front cabin accessory;
a dash panel; and
a mounting beam, comprising: a beam body, the beam body being provided with a plurality of mounting areas, and the plurality of mounting areas being configured to mount the front cabin accessory,
wherein the beam body comprises:
a first cross beam and a second cross beam, the first cross beam and the second cross beam being arranged in parallel and spaced apart from each other, and each of the first cross beam and the second cross beam being coupled between the left shock absorber tower and the right shock absorber tower; and
a first oblique beam and a second oblique beam, each of the first oblique beam and the second oblique beam intersecting with the second cross beam, a first end of the first oblique beam and a first end of the second oblique beam being coupled to the first cross beam, a second end of the first oblique beam being coupled to a second end of the second oblique beam to form a first joint, and the first joint being coupled to the dash panel,
wherein the beam body comprises a plurality of longitudinal beams, and the plurality of longitudinal beams is coupled between the first cross beam and the second cross beam and spaced apart from each other along a transverse direction of the beam body; and
the plurality of longitudinal beams comprises a first longitudinal beam and a second longitudinal beam, the first longitudinal beam, the second longitudinal beam, the first cross beam and the second cross beam form a rectangular structure, and the rectangular structure forms a first mounting area; and the front cabin accessory comprises a compressor, and the compressor is assembled at the rectangular structure.

16. The front cabin assembly according to claim 15, wherein
a first end of the first cross beam and a first end of the second cross beam are coupled to the left shock absorber tower, and a center point of the left shock absorber tower is located between the first cross beam and the second cross beam; and
a second end of the first cross beam and a second end of the second cross beam are coupled to the right shock absorber tower, and a center point of the right shock absorber tower is located between the first cross beam and the second cross beam.

17. The front cabin assembly according to claim 15, wherein the front cabin accessory comprises at least one of a compressor, a cooling module, an expansion tank or an air conditioner motor body.

18. A vehicle, comprising:
a front cabin assembly, comprising:
a left shock absorber tower;
a right shock absorber tower;
a front cabin accessory;
a dash panel; and
a mounting beam, comprising: a beam body, the beam body being provided with a plurality of mounting areas, and the plurality of mounting areas being configured to mount the front cabin accessory,
wherein the beam body comprises:
a first cross beam and a second cross beam, the first cross beam and the second cross beam being arranged in parallel and spaced apart from each other, and each of the first cross beam and the second cross beam being coupled between the left shock absorber tower and the right shock absorber tower; and
a first oblique beam and a second oblique beam, each of the first oblique beam and the second oblique beam intersecting with the second cross beam, a first end of the first oblique beam and a first end of the second oblique beam being coupled to the first cross beam, a second end of the first oblique beam being coupled to a second end of the second oblique beam to form a first joint, and the first joint being coupled to the dash panel,
wherein the beam body comprises a plurality of longitudinal beams, and the plurality of longitudinal beams is coupled between the first cross beam and the second cross beam and spaced apart from each other along a transverse direction of the beam body; and
the plurality of longitudinal beams comprises a first longitudinal beam and a second longitudinal beam, the first longitudinal beam, the second longitudinal beam, the first cross beam and the second cross beam form a rectangular structure, and the rectangular structure forms a first mounting area; and the front cabin accessory comprises a compressor, and the compressor is assembled at the rectangular structure.

* * * * *